United States Patent [19]
Lee

[11] Patent Number: 4,787,172
[45] Date of Patent: Nov. 29, 1988

[54] CULTIVATING DEVICE FOR BEAN SPROUTS

[75] Inventor: Soo H. Lee, Seoul, Rep. of Korea

[73] Assignee: Chan Beom Kim, Seoul, Rep. of Korea

[21] Appl. No.: 43,750

[22] Filed: Apr. 29, 1987

[30] Foreign Application Priority Data

May 2, 1986 [KR] Rep. of Korea ........ UM 86-6111[U]

[51] Int. Cl.⁴ .............................................. A01C 1/00
[52] U.S. Cl. .............................................. 47/16
[58] Field of Search .............. 47/16, 59, 60, 61, 62, 47/63, 64, 65, 48.5; 239/251

[56] References Cited

U.S. PATENT DOCUMENTS

| | | | |
|---|---|---|---|
| 1,396,235 | 11/1921 | Renstrom | 47/16 |
| 3,642,207 | 2/1972 | Krogman | 239/251 |
| 3,768,201 | 10/1973 | Yoo | 47/16 |
| 4,006,559 | 2/1977 | Carlyon, Jr. | 47/16 |
| 4,033,072 | 7/1977 | Kobayashi et al. | 47/62 |
| 4,062,277 | 12/1977 | Powers | 47/16 |
| 4,180,941 | 1/1980 | Korematsu | 47/61 |

Primary Examiner—Robert A. Hafer
Attorney, Agent, or Firm—Birch, Stewart, Kolasch & Birch

[57] ABSTRACT

A device for cultivating bean sprouts comprises at least one cultivating container, a bubble generating pump, a control unit which controls the bubble generating pump, a timer, an electric heater, and a temperature sensor. Also, the device further comprises a U-shaped tube for supplying the water in a water reservoir tank to a water-ascending pipe which is disposed in the center of the cultivating container. An air conduit injects air bubbles into the water ascending pipe which terminates in a T-shaped rotable injection pipe disposed at the top end of the of the water-ascending pipe. Spaced-apart sieve plates are disposed on the top and the bottom of the cultivating container for housing and treating the beam sprouts which can be automatically irrigated.

10 Claims, 4 Drawing Sheets

4,787,172

CULTIVATING DEVICE FOR BEAN SPROUTS

BACKGROUND OF THE INVENTION

The present invention relates to a device for rapidly, and conveniently cultivating bean sprouts, More particularly, the present invention relates to a cultivating apparatus for bean sprouts, green bean sprouts, malts or the like, which is structured with at least one cultivating container, an automatic watering system, spaced-apart sieve plates, and a control unit whereby the various sprouts or malts can be automatically cultivated in a short time period.

Most cultivating devices for bean sprouts are well known which utilize a cultivating container including a plurality of holes disposed at the bottom thereof for periodically and frequently irrigating the bean sprouts. However, since the water cannot be automatically fed during a predetermined time period, the bean sprouts to be cultivated would be withered up or spoiled.

In order to try to eliminate the disadvantages mentioned above, recently conventional types of cultivating devices have been provided. For example, FIG. 5A shows a prior art cultivating device for bean sprouts which comprises a cultivating container 36, a water reservoir 34 disposed on the cultivating container 36 and a water tank 31 containing a water collecting bowl 32 connected to a small size hose 33. The water is dropped through the small size hose 33 from the water tank 32 into the water reservoir 34. When the water in the water reservoir 34 accumulates up to the level of the U-shaped tube 35, the U-shaped tube is submerged. The air in the U-shaped tube 35 is automatically removed from the tube by the pressure of the water, and then the water flows down through the U-shaped tube 35 from the water reservoir 34 into the cultivating container 36 until the water level in the water reservoir 34 falls below the level of the inlet of the U-shaped tube 35. Thus the water irrigates the bean sprouts in the cultivating container 36 and is then drained through a drain hose 37 into an additional tank 38. Thus, when the water in the water tank 31 is exhausted the water must be manually refilled. Furthermore, the outlet of the small size hose 33 connected to the water collecting bowl 32 tends to become clogged during the operation of the device.

Also, in FIG. 5B, a prior art cultivating device is shown which comprises a water collecting tank 41 located on a cultivating container 47, and a bubble generator 43. The water collecting tank 41 is supplied with water through a water-ascending hose 44 by the force of the bubbles generated by the bubble generator 43. When the water accumulates up to a predetermined level in the water collecting tank 41, a rubber stopper 46 connected to a floating member 45 is pulled up by the floating member and the water in the water collecting tank 41 falls through the aperture occupied by the stopper 46. Thus, the force of the water damages the bean sprouts to be cultivated.

OBJECTS AND SUMMARY OF THE INVENTION

Accordingly, it is an object of the present invention to provide an improved cultivating device for bean sprouts.

Another object of the present invention is to provide a cultivating device which comprises at least a cultivating container and an automatic irrigation system for conveniently cultivating the bean sprouts in a short period time even at home as well as at in a factory.

Still another object of the present invention is to provide a cultivating device which is structured with spaced-apart sieve plates which are disposed at the top and the bottom of a supply of bean sprouts. Sufficient distance is maintained between the bean sprouts so that they can be cultivated into a suitable size and shape.

A further object of the present invention is to provide a cultivating device which is structured with a sensor for sensing the temperature in the cultivating container for maintaining the most suitable cultivating condition for the bean sprouts, and a plurality of spray nozzles are provided for sprinkling the water periodically on the bean sprouts in accordance with predetermined time schedule.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to a device for cultivating bean sprouts which comprises at least one cultivating container, a bubble generating pump, a control unit which controls the bubble generating pump, a timer, an electric heater, and a temperature sensor. Also, the device further comprises a U-shaped tube for supplying the water in a water reservoir tank to a water-ascending pipe which is disposed in the center of the cultivating container. An air conduit injects air bubbles into the water ascending pipe which terminates in a T-shaped rotable injection pipe disposed at the top end of the of the water-ascending pipe. Spaced-apart sieve plates are disposed on the top and bottom of the cultivating container for housing and treating the bean sprouts which can be automatically irrigated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
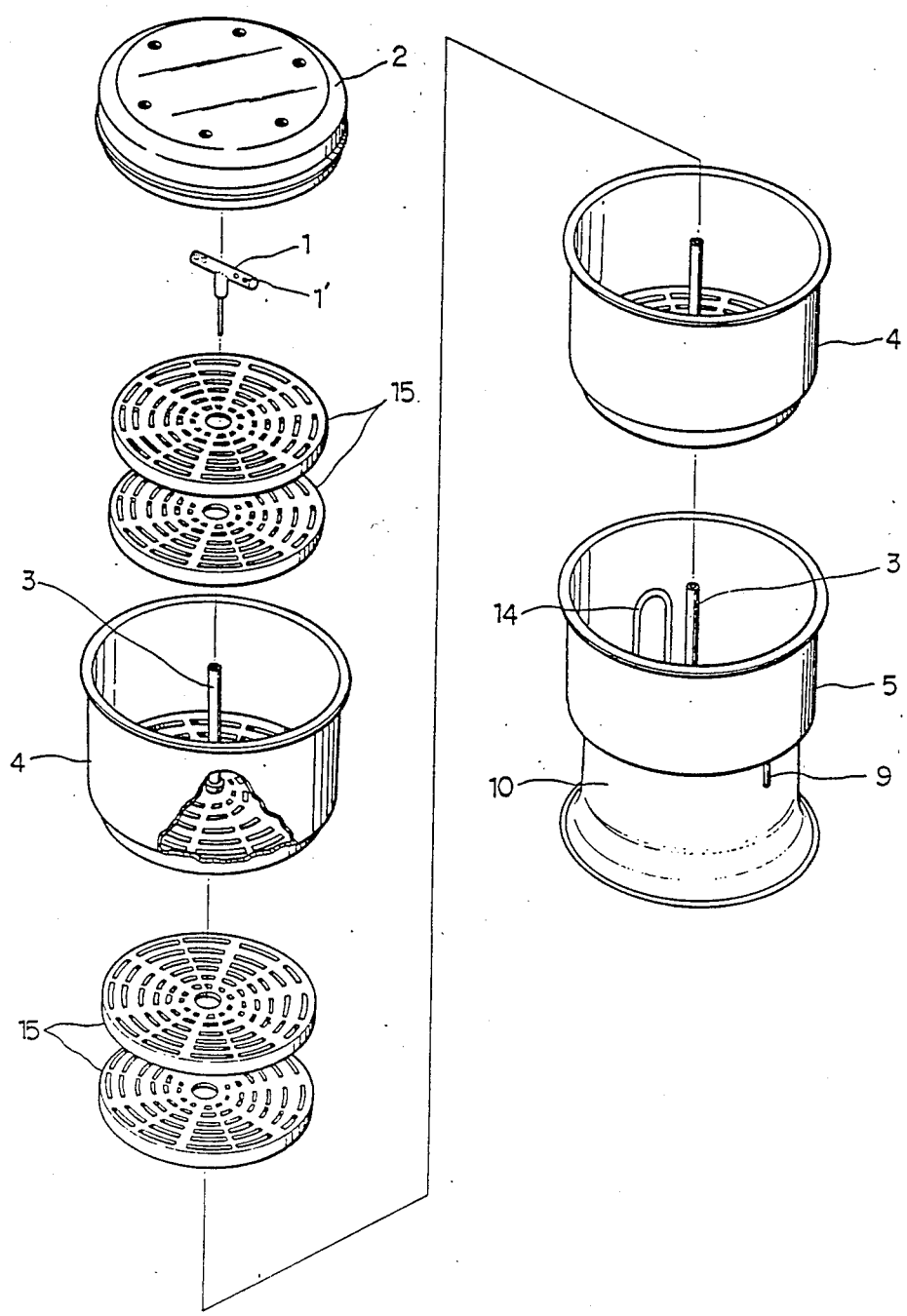
FIG. 1 is an exploded, perspective view of the cultivating device of the present invention.
Figure 2:
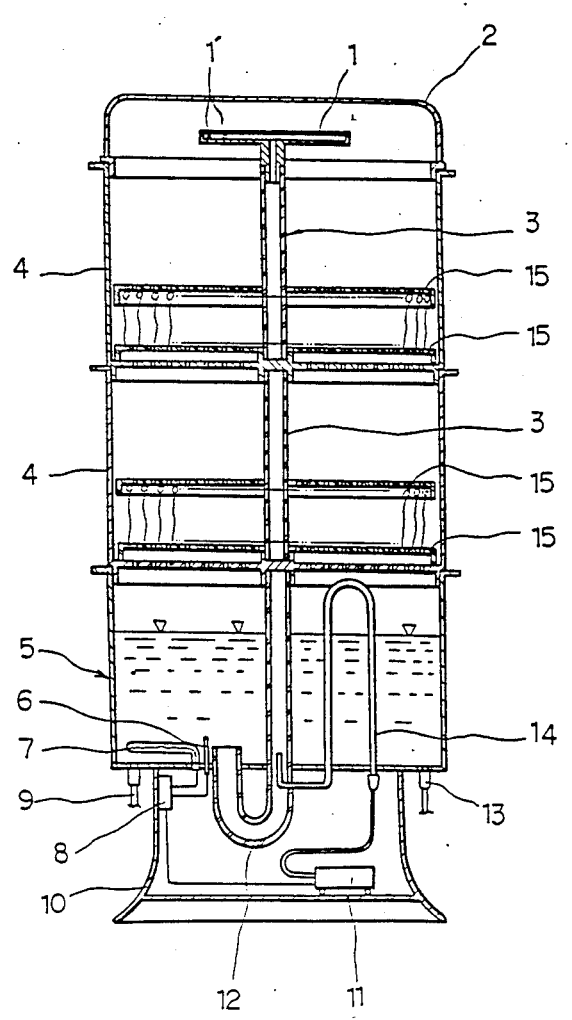
FIG. 2 is a sectional view of the assembled cultivating device of the present invention.

Referring now in detail to the drawings for the purpose of illustrating the present invention, the cultivating device as shown in FIGS. 1 and 2 comprises a base member 10, a water reservoir tank 5 attached to the base member 10, and at least one cultivating container 4 containing spaced-apart sieve plates 15 disposed thereon for housing a supply of bean sprouts disposed therebetween. The base member 10 contains an air pump 11 for generating air bubbles which carry the water up an ascending pipe 3 to the top of the container. A control unit 8 electrically controls the air pump 11. The control unit 8 is provided with an electric heater 7 and a temperature sensor 6 which extends into the water reservoir tank 5. A U-shaped tube 12 which has its lower end disposed in the water reservoir tank 5, extends down into the base member 10, and then back through the water reservoir tank 5. The other end of the U-shaped tube 12 connects with the water ascending pipe 3 disposed at the center of the cultivating container 4. The end of the water ascending pipe 3 contains a T-shaped rotating injection pipe 1 which is provided with a plurality of nozzles 1' disposed on the end portions thereof.

When water is filled in the water ascending pipes 3 through the U-shaped tube 12 and the control unit 8 is actuated to control the air pump 11, air bubbles are generated by the air pump 11 through conduit 14 and are injected into the U-shaped tube 12 through conduit 14. The water is caused to rise through the water-ascending pipes 3 by the buoyancy of the air bubbles. The water in the water-ascending pipe 3 eventually reaches the rotating injection pipe 1. The water is thus sprayed through the plurality of nozzles 1' disposed on the T-shaped injection pipe 1, which is perforated on the ends portion of the horizontal pipe 1 in opposite directions. Therefore, the rotating injection pipe 1 is continuously rotated by the force generated from the injecting water flowing through the plurality of nozzles. Thus, the T-shaped rotating injection pipe 1 sprinkles the water uniformly on the bean sprouts, or the like, to be cultivated.

The cultivating containers 4 which can be stacked in any desired number within the cultivating device. A variety of products, for example, bean sprouts, seeds, etc., can be simultaneously cultivated, if desired.

Figure 3:
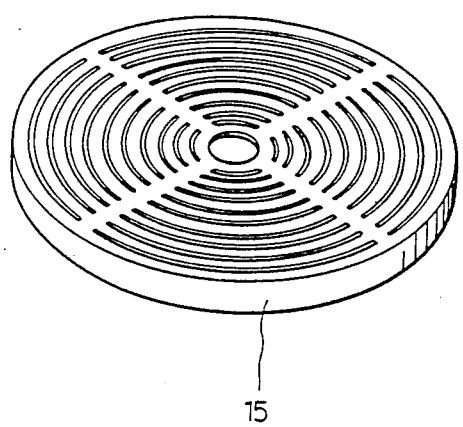
FIG. 3 is a perspective view of a sieve plate of the cultivating device of the present invention.

As shown in FIG. 3, the sieve plate 15 contains a plurality of elongated holes disposed on circular arcs provided in the surface thereof. The width of the circular arcs is about 0.5 mm so that the water can be uniformly distributed on the bean sprouts. To construct the device, one sieve plate 15 is placed on the bottom of the cultivating container 4. The beans to be cultivated are then spread on the sieve plate 15 covered with the other sieve plate 15 which is spaced-apart a predetermined distance from the first sieve plate to limit the height of the bean sprouts.

The control unit 8 connected to the electric heater 7, temperature sensor 6 air pump 11, and the timer (not shown) controls the spraying of the water on the bean sprouts. Also, the control unit 6 controls the activation of the air pump 11 periodically at predetermined periods of time. Thus, the water is sprinkled on the bean sprouts uniformly when necessary to be irrigated. Furthermore, the electric heater 7 and temperature sensor 6 operate to heat the water in the water reservoir tank 5 and maintain the desired temperature of about 20° C. which is the most preferable temperature for growing the bean sprouts. Therefore, the water temperature of the water reservoir tank 5 is continuously maintained within the constant temperature of about 20° C. so that the cultivating process can be rapidly achieved.

Drain hoses 9 are used for changing the water in the water reservoir tank 5. When the nipples 13 for closing the drain hoses 9 are closed, the water cannot leak through the drain hoses so that the water reservoir tank 5 is completely sealed.

Figure 4:
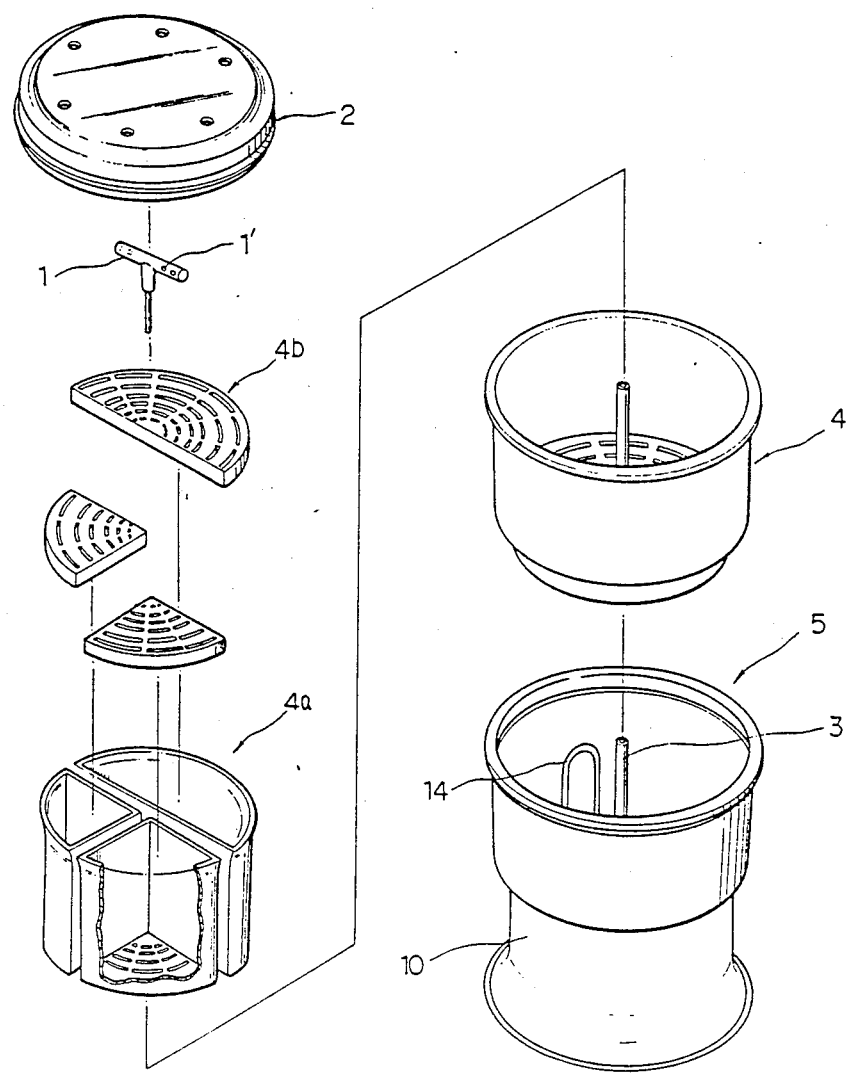
FIG. 4 is an exploded, perspective view of another embodiment of the present invention.
Figure 5A:
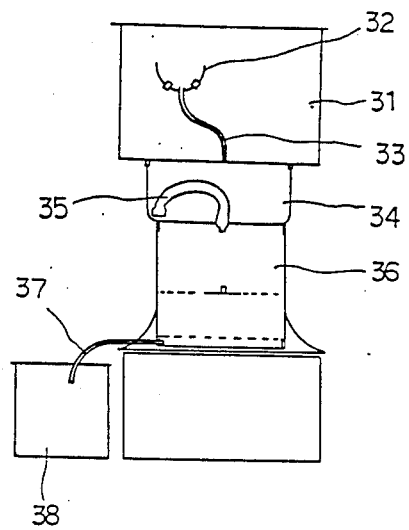
FIGS. 5A and 5B diagrammatically show cultivating device of the prior art.
Figure 5B:
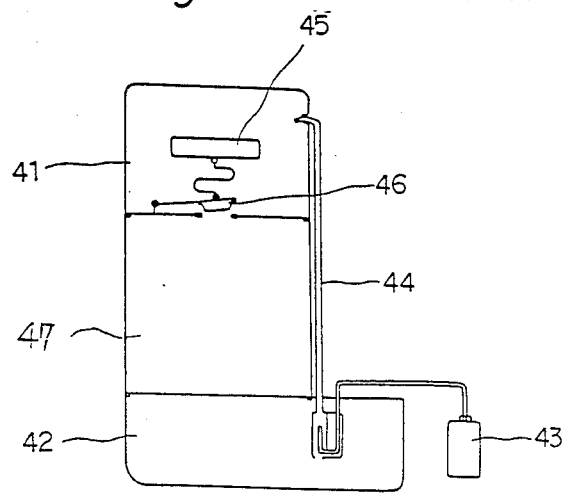

Referring in detail to FIG. 4, there is illustrated another embodiment of the cultivating device according to the present invention. FIG. 4 is an exploded, perspective view which illustrates a partitioned cultivating container 4a. The partitioned containers 4a are partitioned in three parts and placed together into the cultivating container 4 (FIGS. 1 and 2) so that various small quantities of bean sprouts, green bean sprouts, malts and the like can be cultivated together simultaneously. The partitioned containers 4a are formed as a one half circle container and two, quarter circle containers. Also, the partitioned containers 4a are adapted to slidably receive similarly configurated sieve plates 4b disposed thereon. For example, a half circle plates, and two quarter circle plates can be typically utilized. The non-circular plates 4b contains a plurality of holes disposed on circular arcs thereon in the same manner as the sieve plates 15 which are inserted in the bottom of corresponding partitioned containers 4a.

The object of the partitioned sieve plates 4b is to make the height of the bean sprouts uniform and to make bean sprouts with thick stems.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

I claim:

1. A cultivating device for growing vegetables which comprises:

a water reservoir tank, at least one cultivating container compositely stacked on said water reservoir tank, two spaced-apart sieve plates disposed in said cultivating container, said vegetables being disposed between said sieve plates, ascending tube means positioned within said water reservoir tank and said cultivating container for protecting said tube means from inadvertent dmage, one end of said ascending tube means communicating with the water disposed in the water reservoir tank with a U-shaped configuration and the other end thereof extending above the cultivating container, a T-shaped injection pipe rotatably provided at said other end of said ascending tube means, said T-shaped injection pipe containing arm members which contain spray nozzles positioned at the end portions thereof, said spray nozzles on the end of said arm members being disposed to face in opposite directions so that through the introduction of the water to the T-shaped injection pipe, the T-shaped injection pipe being caused to rotate for sprinkling the water uniformly on the growing vegetables in said cultivating container, pump means communicating with said ascending tube means for generating air bubbles and pumping water from the water reservoir tank to the spray nozzles, heating means disposed in said water reservoir tank for controlling the temperature of the water disposed in the water reservoir tank, temperature sensing means disposed in said water reservoir tank for sensing the temperature of the water disposed in the water reservoir tank, and control means operatively connected with said pump means, said heating means and said temperature sensing means for controlling the environment of the device for sprinkling the water periodically on the growing vegetables in the cultivating container in accordance with predetermined time schedule.

2. The cultivating device of claim 1 wherein a plurality of culitvating container are stacked one on top of the other.

3. The cultivating device of claim 1 wherein the spaced-apart sieve plate contains a plurality of elongated holes disposed on circular arcs provided on the surface thereof.

4. The cultivating device of claim 3 wherein the width of the circular arcs is about 0.5 mm for uniformly distributing water on the vegetables to be cultivated.

5. The cultivating device of claim 1 wherein the control means further controls a timer associated with the device for controlling the spraying of the water on the vegetable to be cultivated.

6. The cultivating device of claim 1 wherein the desired temperature of the water disposed in the water reservoir tank is about 20° C.

7. The cultivating device of claim 1 wherein the water reservoir tank contains drain hoses having nipples for changing the water therein.

8. The cultivating device of claim 1 wherein the cultivating container is divided into numerous parts for cultivating small quantities of the growing vegetables.

9. The cultivating device of claim 8 wherein the cultivating device is divided into three parts to form a one-half circle and two, quarter circles.

10. The cultivating device of claim 9 wherein the divided containers is adapted to slidably receive similarly configured spaced-apart sieve plates disposed therein.

* * * * *